United States Patent
Lakshmikantha et al.

(10) Patent No.: US 11,514,317 B2
(45) Date of Patent: Nov. 29, 2022

(54) MACHINE LEARNING BASED RESOURCE AVAILABILITY PREDICTION

(71) Applicant: EMC IP Holding Company LLC, Hopkinton, MA (US)

(72) Inventors: Shashikanth Lakshmikantha, San Jose, CA (US); Sankalp Suhas Taralekar, Santa Clara, CA (US); Tuan Nguyen, San Jose, CA (US); Venkata Narasa Kumar Kuchi, San Jose, CA (US); Koushik Nagaraj Godbole, Santa Clara, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 332 days.

(21) Appl. No.: 16/830,058

(22) Filed: Mar. 25, 2020

(65) Prior Publication Data
US 2021/0303985 A1    Sep. 30, 2021

(51) Int. Cl.
| | |
|---|---|
| *G06N 3/08* | (2006.01) |
| *G06F 16/11* | (2019.01) |
| *G06N 3/04* | (2006.01) |
| *G06F 11/34* | (2006.01) |
| *G06F 11/30* | (2006.01) |

(52) U.S. Cl.
CPC .......... *G06N 3/08* (2013.01); *G06F 11/3034* (2013.01); *G06F 11/3495* (2013.01); *G06F 16/11* (2019.01); *G06N 3/0445* (2013.01)

(58) Field of Classification Search
CPC ............. G06F 11/3409; G06F 11/3495; G06F 11/3034; G06F 11/3447; G06F 16/11; G06N 3/0445; G06N 3/08
See application file for complete search history.

(56) References Cited

U.S. PATENT DOCUMENTS

| | | | | |
|---|---|---|---|---|
| 8,285,747 | B1* | 10/2012 | English | G06F 3/0605 707/782 |
| 8,467,281 | B1* | 6/2013 | Colon | G06F 11/3485 369/47.1 |
| 2007/0050684 | A1* | 3/2007 | Takaoka | G06F 3/0653 714/E11.206 |
| 2015/0081588 | A1* | 3/2015 | Grammas | G06Q 10/06 705/342 |
| 2017/0078442 | A1* | 3/2017 | Pacella | H04L 67/1008 |
| 2019/0065061 | A1* | 2/2019 | Kim | G06F 3/0665 |
| 2020/0201759 | A1* | 6/2020 | Korzh | G06F 12/0802 |
| 2021/0224700 | A1* | 7/2021 | Wang | G06K 9/6261 |

* cited by examiner

*Primary Examiner* — Etienne P Leroux
(74) *Attorney, Agent, or Firm* — Staniford Tomita LLP

(57) ABSTRACT

Requests from file system services of a storage system are registered. Each file system service, when executed, utilizes one or more resources of the storage system. Each request includes information describing resource requirements required by a respective file system service. Resource utilization data of the resources are collected over a period of time. The resource utilization data includes an identification of a resource, a timestamp, and a measurement indicating a utilization level of the resource corresponding to the timestamp. A machine learning model is trained to predict utilization patterns of the resources. Execution of the file system services are scheduled based on the predicted utilization patterns. Monitoring is conducted during the execution of the file system services. Based on the monitoring a determination is made as to whether the machine learning model should be retrained.

17 Claims, 10 Drawing Sheets

FIG. 3

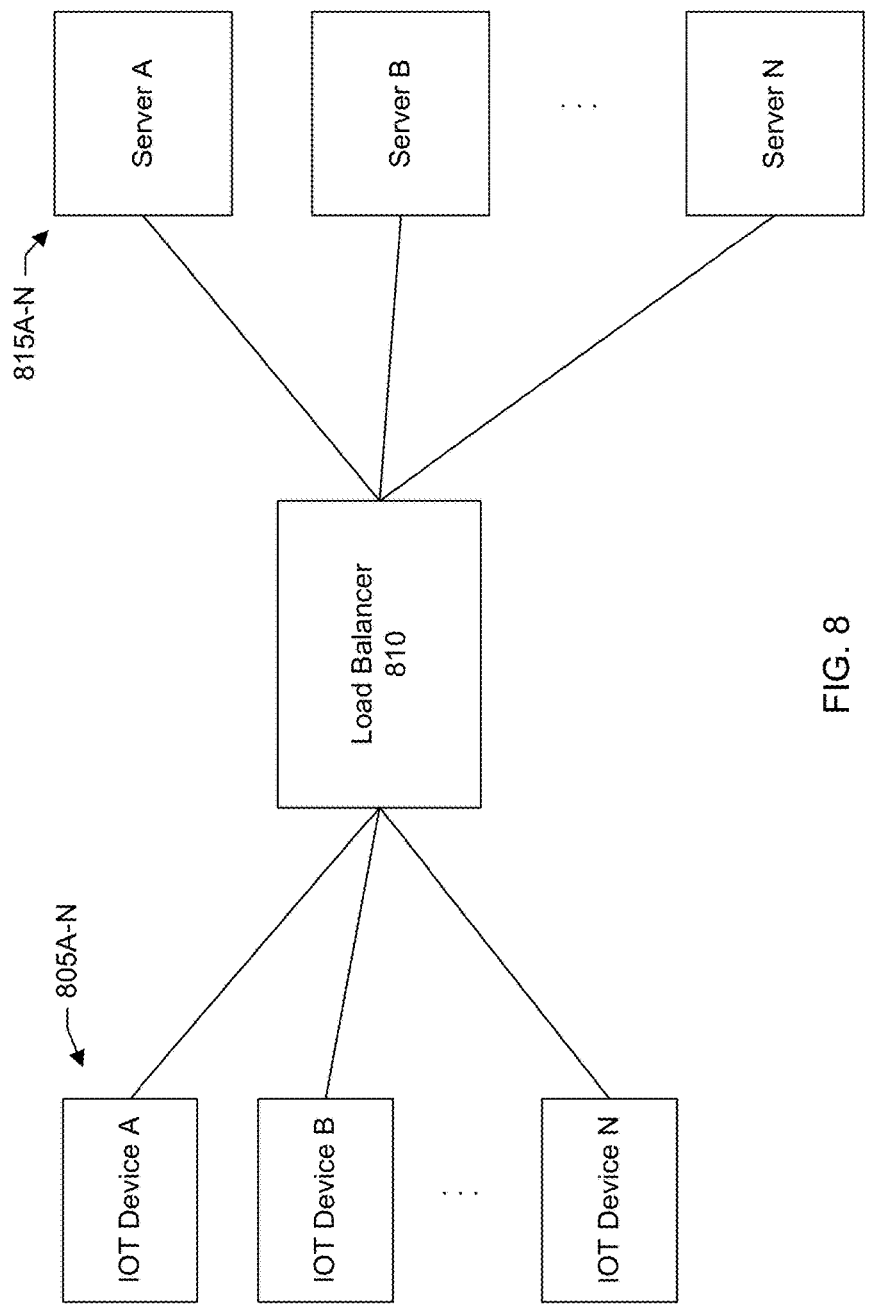

MACHINE LEARNING BASED RESOURCE AVAILABILITY PREDICTION

TECHNICAL FIELD

The present invention relates generally to information processing systems, and more particularly to applying machine learning to predict resource availability and schedule services accordingly.

BACKGROUND

The functioning of a computer system, including distributed computing networks and storage systems, relies on the regular execution of a variety of underlying services. Such services, when executed, consume resources such as disk, processing cycles, memory, network, and so forth. These services are necessary to help guarantee the integrity of the system, detect problems, reclaim storage space, and much more.

Administrators typically schedule these services to run at fixed times such as off-peak hours when use of system resources is expected to be low. Increasingly, however, computer systems are being asked to process workloads 24/7 as globalization has resulted in connected systems being deployed all across the world and in different time zones. For example, a distributed or network system may be used by users in India and the U.S. Local times that may be considered off-peak in the U.S. may correspond to peak times in India, and vice-versa.

Further, as the resource utilization changes over time, fixed or manual scheduling becomes inefficient when it collides with resource busy times and/or underutilizes available resources at other times.

Therefore, there is a need for systems and techniques that can adapt to changes and provide intelligent scheduling of services so as to make efficient use of resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 shows a screenshot of a performance log for a disk resource, according to one or more embodiments.

FIG. 7 shows an example of availability windows, according to one or more embodiments.

FIG. 8 shows a block diagram of load balancing in which machine learning algorithms may be applied to balance loads, according to one or more embodiments.

DETAILED DESCRIPTION

Figure 1:
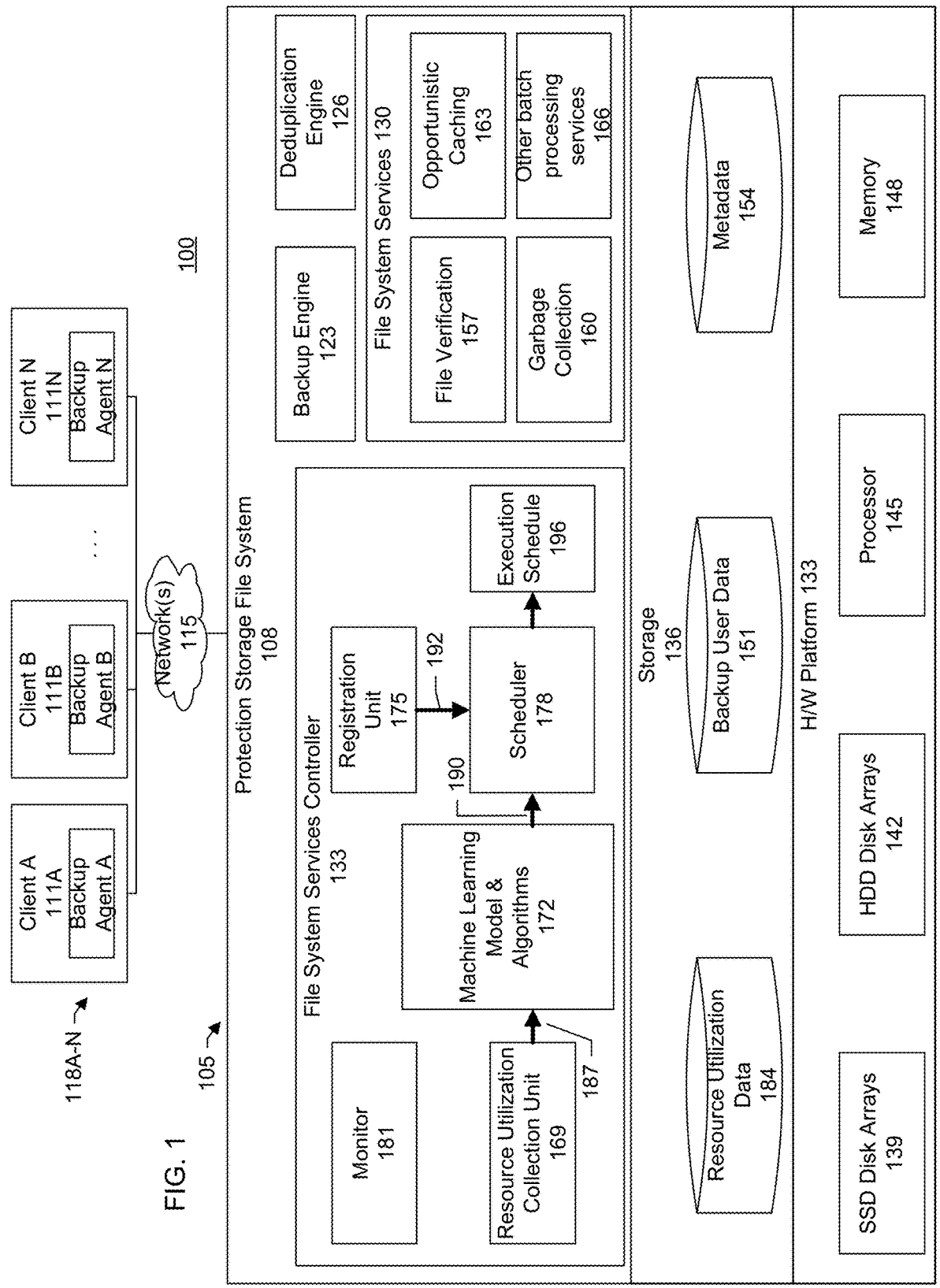
FIG. 1 shows a block diagram of an information processing system comprising a file system services controller that applies machine learning to automatically schedule file system services, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for applying machine learning to predict resource availability and schedule services accordingly. Today, many system services are manually scheduled or run on periodic intervals via a fixed schedule. Some examples of such system services include: 1) data ingest load balancing in Internet of Things (IoT) environments; 2) file system batch processing services such as file verification, garbage collection (GC), file caching on a solid state disk (SSD) cache; and 3) replication services such as synchronous (sync) and asynchronous (async) replication.

As the resource utilization changes over time, fixed or manual scheduling becomes inefficient when it collides with resource busy times and/or underutilizes available resources at other times.

In a specific embodiment, systems and techniques are provided to apply machine learning in connection with resource utilization pattern detection, resource availability prediction using the detected pattern, and automated scheduling of system services using the predicted resource availability. These systems and techniques improve upon manual and fixed scheduling with automated scheduling using machine learning algorithms. In a specific embodiment, machine learning algorithms analyze the historical resource utilization of different system resources. In particular, systems and techniques are provided for 1) training the machine learning model using past resource utilization percentage to determine resource utilization patterns; 2) using the trained model, predicting the utilization pattern at a future time; and 3) using the predicted utilization pattern, automating the scheduling of system operations.

In a specific embodiment, machine learning techniques are applied to scheduling file system services in a storage or protection storage system. These file system services may be referred to as batch processing type services. In a specific embodiment, these file system services are executed in a storage system and may include one or more of metadata intensive operations (e.g., file verification, file system metadata checker); free blocks reclamation (e.g., garbage collection); opportunistic caching of metadata (e.g., cache hot data or recently used data on solid state disks (SSDs)); and scheduling workloads that need crash proof guarantees via non-volatile random-access memory (NVRAM) (e.g., redirecting workloads utilizing Network File System (NFS) protocols to a DD Boost File System (BoostFS), as provided by Dell EMC, to improve backup times).

While such system services may not serve the customer user directly, they help ensure proper system operation. In a specific embodiment, machine learning algorithms running on a storage system predicts resource utilization times at a future time by recognizing prior utilization patterns. In a specific embodiment, the prediction is in terms of availability windows which can be utilized to schedule respective services to achieve the good system efficiency.

FIG. 1 shows a block diagram of a computer network or information processing system 100 that uses machine learning for scheduling file system services including metadata intensive operations or ops. In the example shown in FIG. 1, there is a data protection storage system 105 having a file system 108. In a specific embodiment, the file system is a deduplication file system. The file system is accessible by clients 111A-N over a network 115. The clients include backup agents 118A-N.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of system 100, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The protection storage file system includes a backup engine 123, deduplication engine 126, file system services 130, file system services controller 133, and storage 136. The file system is supported by an underlying hardware infrastructure. The hardware may include an SSD disk array 139, hard disk drive (HDD) array 142, processor 145, memory 148, and other computer hardware components. As a further example, the underlying infrastructure may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks.

The backup engine coordinates with the backup agents executing at the client machines to backup (e.g., copy) data from the clients to the protection storage file system. Such data may be stored as backup user data 151. Thus, the storage system may be referred to as a backup storage system, backup server storage system, or data protection storage system. At various times, backup jobs may be executed at each of the different clients to backup data to the storage system. There can be a backup window during which a backup job may be allowed to run. For example, a backup job may be scheduled to run during off-peak hours (e.g., midnight to 3:00 AM). There can be daily and weekly backup jobs.

The deduplication engine is responsible for deduplicating data entering the file system. In this specific embodiment, the file system divides the ingested stream of data into segments. The segment of data is hashed using a cryptographic hash for example Secure Hash Algorithm 1 (SHA-1). The output of the hashing algorithm is the fingerprint which uniquely describes that segment of data in the storage system.

An index of all the fingerprints is maintained in the system and are fetched before any new data is written down. The index may be referred to as a fingerprint index. Newly arriving segments are filtered out against duplicates using the existing fingerprints in the index and then the new segments are packed into a container along with fingerprints and appended as a log. The index points to this container-identifier (e.g., container number) in the log. Thus, a segment that happens to be the same as another segment that is already stored in the file system may not be again stored. This helps to eliminate redundant data and conserve storage space.

As data such as files are ingested and deduplicated, metadata 154 associated with the deduplicated data is generated and stored. The metadata includes references or pointers to data or file segments and allows the file system to reconstruct or reassemble the file using the already or previously stored segment.

In order to ensure the reliability, integrity, and enhance the performance of the file system, one or more file system services may be executed. As discussed, some examples of file system services include file verification 157, garbage collection 160, opportunistic caching 163, and other batch processing services 166.

A file system having deduplication is more vulnerable to missing data segment problems than traditional non-deduplication file systems. In a deduplication file system, there are many complex interactions among the data ingest, garbage collection, replication, and migration processes that may result in unintended data corruption. It is important to detect such data corruption as early as possible so that the user can recover the data from another source and the problem can be addressed before any further issues occur.

File verification is a process to check for missing segments. Within the deduplication file system, it is desirable to guarantee the integrity among the segments, the segment references, and the fingerprint index. To ensure the integrity of the file system, it is desirable to ensure that segmented user data is reachable through pointers, references, or other metadata. Inconsistency among the fingerprint index, segments, and its references can occur in the file system due to hardware failure or software bugs. It is desirable that any missing segments be quickly identified so that corrective actions can be taken. A process of file verification is further discussed in U.S. patent application Ser. No. 16/034,282, filed Jul. 12, 2018, which is incorporated by reference along with all other references cited.

Garbage collection is a process to reclaim or recover disk space such as by deleting or removing segments that are no longer referenced, deleting or removing expired backup copies, and other space reclamation operations.

Opportunistic caching refers to a process in which data (e.g., files) that are likely to be accessed in the near future is placed into a storage tier having good performance. For example, solid state or flash drives can offer better I/O performance as compared to hard disk drives. Hard disk drives are generally slower as compared to solid state drives, but can be much less expensive than solid state drives with respect to cost per gigabyte (GB) of storage. Identifying data likely to be accessed in the near future and placing such data in an SSD cache can help to provide quick access to the data while also reducing operating costs associated with storing large amounts of data.

Running file verification, garbage collection, opportunistic caching, and other batch processing services, however, consumes resources including disk, CPU, memory, and other computer resources.

It is desirable to schedule these file system services such that their execution does not conflict with the workloads, including backups, of customers of the data protection storage system. For example, file verification may involve traversing and enumerating an entire namespace of the file system. When, for example, a disk array of the protection storage system is busy processing a read or write request from a file system service, there may be an impact to backup performance. A backup job running at the client may not be completed within the specified backup window. An incomplete backup job can result in data not being protected. A backup job that extends past its specified backup window can affect the client's ability to respond to production requests.

In a specific embodiment, the file system services controller uses machine learning to provide intelligent and automatic scheduling of file system services. This allows for the efficient use of resources so that customer workloads, backup jobs, and other production tasks can be completed quickly and the integrity and reliability of the storage system maintained.

In the example shown in FIG. 1, the file system services controller includes a resource utilization collection unit 169, machine learning model and algorithms 172, file system services registration unit 175, scheduler 178, and monitor 181. It should be appreciated that the components and modules shown in FIG. 1 may be functional and there can be many different hardware and software configurations.

The resource utilization collection unit is responsible for collecting utilization data of the storage system resources. The utilization data may be stored as resource utilization data 184. Resource utilization may include a measurement of disk activity, the utilization of disk, disk space, memory, CPU, network, or other resource over a period of time.

For example, disk utilization may be expressed as disk busy percentage (%) which represents a percentage of elapsed time when the disk was busy processing a read or write request. The collection unit may gather such metrics by, for example, gathering performance logs that may be maintained by various resources of the storage system. Examples of resource utilization data, metrics, or counters include % disk read time (amount of time disks are being read), % disk time (amount of time disks are in use), % disk write time (amount of time disks are being written to), % idle time (amount of time disks are idle or not performing any action), current disk queue length (amount of time the operating system must wait to access the disks), disk reads/sec (overall rate of read operations on the disk), disk writes/sec (overall rate of write operations on the disk), split IO/sec (overall rate at which the operating system divides I/O requests to the disk into multiple requests), and others.

CPU utilization refers to a computer's usage of processing resources, or the amount of work handled by a CPU. Actual CPU utilization varies depending on the amount and type of managed computing tasks. Certain tasks require heavy CPU time, while others require less because of non-CPU resource requirements. Disk space may refer to an indication or measurement of available storage space. The disk space may be expressed as a percentage of available disk space, a percentage of used disk space, an absolute value of available disk space, an absolute value of used disk space, or combinations of these.

The machine learning model is built and trained according to machine learning algorithms using utilization data collected by the resource utilization collection unit. The resource utilization data provided to the machine learning algorithms may be referred to as a training data 187. The learning algorithm finds or detects patterns in the training data. The output of the learning algorithm is a machine learning model that can make predictions.

In a specific embodiment, the predictions include a set of availability windows 190. An availability window may include a timetable specifying particular days including starting and ending times, e.g., time slot, when utilization of a particular resource (e.g., disk) is predicted to be available (e.g., low) or, conversely, predicted to be high or not available.

For example, there can be a first availability window associated with a first resource (e.g., disk) where the first availability window specifies a first time slot when utilization of the first resource has been predicted to be low. There can be a second availability window associated with a second resource (e.g., CPU), different from the first resource, where the second availability window specifies a second time slot when utilization of the second resource has been predicted to be low. There can be a third availability window associated with a third resource (e.g., memory), different from the first and second resources, where the third availability window specifies a third time slot when utilization of the third resource has been predicted to be low. The time slots may or may not overlap each other.

The registration unit is responsible for registering 192 the file system services with the scheduler. In a specific embodiment, a registration for a particular file system service includes information describing an estimate of resource requirements required to execute the particular file system service, expected utilization level of a resource, a priority level of the particular file system service, amount of time or duration the resource is expected to be used, or combinations of these.

For example, the information may include an indication of a level or amount of disk activity expected. The information may include an indication of a level or amount of CPU usage expected, and so forth. Different types of file system services can have different resource requirements. For example, a first file system service may require more or less of a first resource (e.g., memory) as compared to a second file system service, different from the first file system service. The registration information may be provided as an Extensible Markup Language (XML) formatted file to the scheduler, text file, or any other competent file format. In another specific embodiment, the registration unit may prompt a user to input an estimate of an amount of a particular resource required by a particular file system service.

Likewise, different types of file system services can have different priority levels. For example, the first file system service may have a first priority (e.g., high). A second file system service may have a second priority (e.g., low), different from the first priority. A priority level can indicate a measurement or degree of importance of a particular file system service. For example, file verification may be prioritized above garbage collection.

The scheduler receives the file system service registration information from the registration unit and the predicted availability windows from the machine learning model. The scheduler analyzes the received information to output a file system services execution schedule 196. The file system services execution schedule may include a timetable specifying time slots when each file system service should be executed (and when the file system service should be stopped or suspended). In a specific embodiment, a file system service that is not completed within its assigned time slot may be resumed at a later time. For example, in this specific embodiment, the file system service may notify the scheduler that it was unable to complete its task within the assigned time slot. A bookmark may be stored indicating a progress of the file system service. The scheduler may then update the execution schedule and assign another time slot to the file system service. The file system service can use the stored bookmark to resume from where it stopped.

In a specific embodiment, the scheduler executes an algorithm that attempts to match a resource requirement of a particular file system service to an availability window associated with a corresponding resource and indicating low utilization of the corresponding resource during a time period specified by the availability window.

Consider, as an example, that registration information for a first file system service indicates requirement of a first resource; and registration information for a second file system service, different from the first file system service, indicates requirement of a second resource, different from the first resource. A first availability window associated with the first resource specifies a first time slot where utilization of the first resource is to be low as predicted by the machine learning model. A second availability window associated with the second resource specifies a second time slot where utilization of the second resource is to be low as predicted by the machine learning model. The scheduler may then schedule the first file system service for execution during the first time slot, and the second file system service for execution during the second time slot.

The scheduler may additionally weigh one or more other factors when generating the execution schedule of the file system services. Such factors may include a priority level of a file system service, current resource usage levels, amount of time elapsed since a file system service was last executed, other factors, or combinations of these. For example, a first file system service (e.g., file verification) having a high priority level may be scheduled for execution earlier than a second file system service (e.g., garbage collection) having a low priority level. In other words, the second file system service may be scheduled for execution later than the first file system service.

The scheduler may override the priority level of a file system service during scheduling. For example, the second file system service (e.g., garbage collection) may be scheduled for execution earlier than the first file system service (e.g., file verification) when a measurement of used disk space exceeds a threshold (e.g., 96 percent of disk space used).

The monitor is responsible for monitoring during the execution of the file system services according to the execution schedule. Parameters that the monitor may monitor may include a performance of the backup engine (e.g., backup throughput or speed at which the storage system has ingested backup data as measured in megabytes per second), actual resource utilization patterns, latency, other parameters, or combinations of these.

If the monitoring indicates a high error between predicted and actual utilization patterns, the machine learning model may require retraining before a next set of file system services are scheduled or executed. In this case, the resource utilization collection unit may begin collecting a new set of resource utilization data that is to be used to retrain the machine learning model. In a specific embodiment, data for the actual utilization patterns may be collected by periodically polling the resources during execution of the file system services. For example, a resource, such as a disk array, may expose an application programming interface (API) through which utilization data (e.g., disk busy percentage information) may be obtained. In a specific embodiment, the monitor computes a difference between the predicted utilization patterns and the actual utilization patterns. The difference is compared against a pre-determined threshold. If the difference (or a prediction error) is greater than the pre-determined threshold, then the machine learning model may be retrained.

When comparing between the predicted and actual utilization patterns, the monitor may compensate for the impact on the resources due to the execution of the file system services so as to not skew a calculation of the prediction error. For example, a predicted utilization pattern may indicate low usage of a resource during a particular time slot. Thus, the scheduler may automatically schedule execution of a file system service during the particular time slot. When usage of the resource is monitored during the particular time slot, the usage data may indicate high usage of the resource. However, at least a portion of the usage may be due to the execution of the file system service, rather than due to an error in the prediction. Thus, the monitor may compensate by excluding from the actual utilization pattern the impact on the resource from the executing file system service.

As another example, the monitoring may indicate that backup throughput or latency has fallen below a desired threshold level as a result of unanticipated backup jobs being executed. Thus, backup throughput can serve as a proxy or indication as to whether or not the machine learning model should be retrained. In another specific embodiment, a different performance metric or parameter may instead or additionally be measured to determine whether or not the machine learning model should be retrained. Some examples of performance metrics that may be examined include write throughput, read throughput, time to complete a particular operation (e.g., replication), or other metric. Training and retraining the machine learning model itself requires resources. The monitoring and comparison to a threshold helps to ensure that the model is retrained only when necessary, e.g., large prediction error.

Such cases may arise when a customer of the storage system has made changes including adding new clients to be backed up, identifying new data sources to be backed up, changing the backup schedule or backup windows, adding new clients in different time zones, other system changes, or combinations of these. In these cases, performance of the storage system may be severely degraded because new backup jobs may be executing concurrently with an automatically scheduled file system service. However, the degradation in performance will be detected and recorded. The detection then results in a retraining of the machine learning model to help ensure that execution of subsequent file system services will not occur while there are many backup jobs in progress or during periods of heavy resource utilization.

In a specific embodiment, a technique to determine prediction error rate includes conducting a sampling of actual resource utilization at a start of an automatically scheduled file system service. For example, the sampling may be conducted at a point in time immediately before the file system service begins executing. The sampled actual resource utilization data can then be compared to the previously predicted resource utilization data to determine a difference between the actual resource utilization level and the predicted utilization level. If the difference exceeds a pre-determined threshold or acceptable error, the machine learning model may be retrained.

Consider, as an example, that a predicted utilization pattern includes a timetable showing low disk utilization on Sunday from 2:00 AM to 4:00 AM. In this example, the scheduling service, before it starts the file system service at 2:00 AM, checks if the prediction matches reality. The difference between the two is the prediction error.

As another example, consider that a predicted utilization pattern indicates a low disk busy percent of 9% on Sunday at 2:00 AM. The scheduler may thus schedule a file system service to begin on Sunday at 2:00 AM. In order to assess the accuracy of the prediction, a sampling of resource utilization (e.g., disk activity) may be conducted Sunday at 1:59 AM. If the actual disk utilization is, for example, 10%, then the difference between the predicted and actual may be within the acceptable margin of prediction error and retraining may not be necessary. If, however, the actual disk utilization is much higher, for example, 40%, then the difference between the predicted and actual may be outside the acceptable margin of prediction error and the retraining may be performed. This technique of sampling immediately before the execution of the file system service helps to ensure that resource utilization data is isolated to activity related to customer workloads, backups, and other production activity and not skewed due to the execution of a file system service.

Figure 2A:
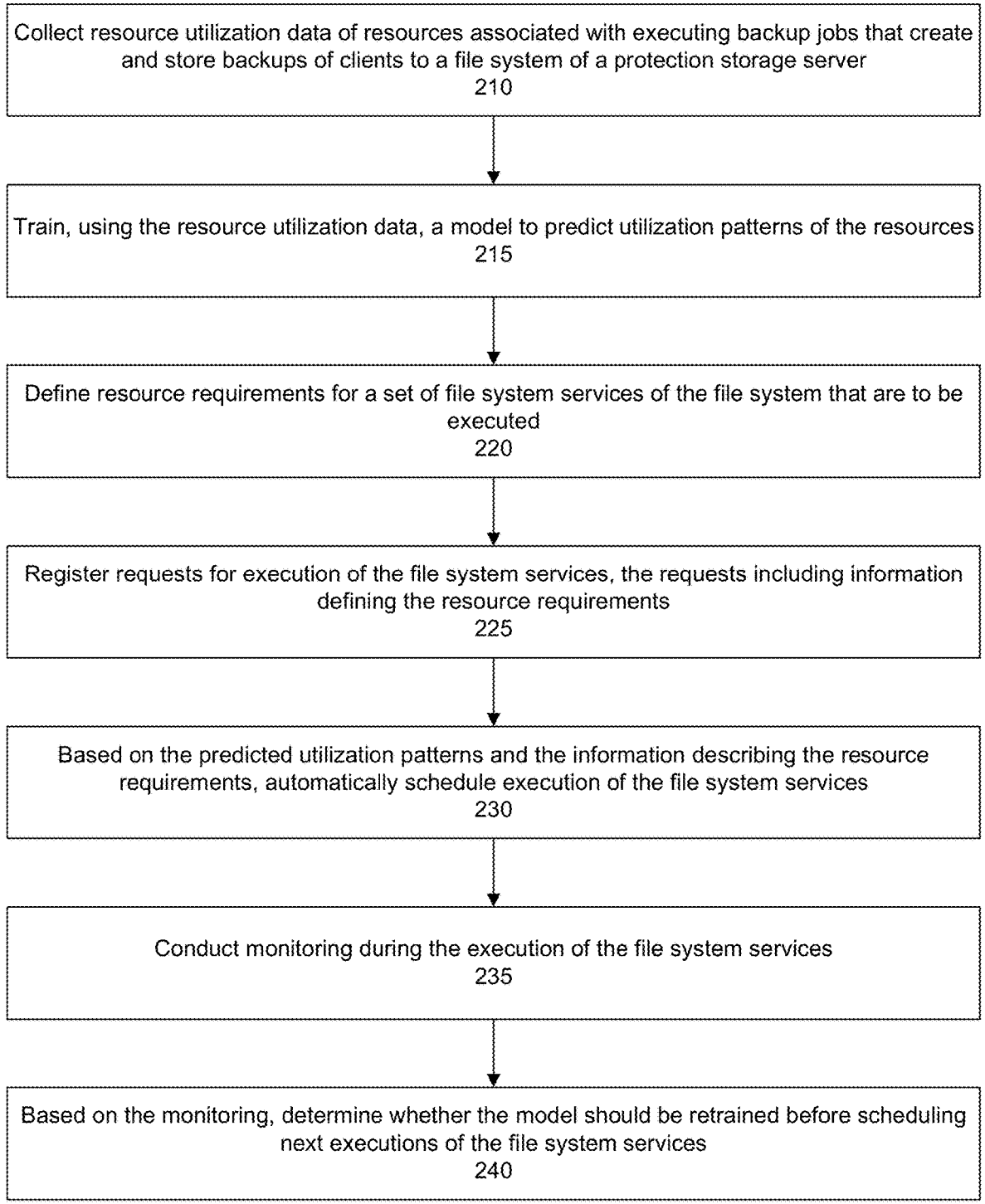
FIG. 2A shows an overall flow for applying machine learning in connection with automatically scheduling file system services, according to one or more embodiments.

FIG. 2A shows an overall flow for machine learning-based resource availability prediction for automated scheduling of system services. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210, resource utilization data of resources associated with executing backup jobs that create and store backups of clients to a file system of a protection or backup storage server is collected. In a step 215, using the resource utilization data, a model is trained to predict utilization patterns of the resources. In a step 220, resource requirements for a set of file system services that are to be executed are defined. In a step 225, requests for execution of the file system services are registered, the requests including information defining the resource requirements.

In a step 230, based on the predicted utilization patterns and the information describing the resource requirements, execution of the file system services are automatically scheduled. In a step 235, monitoring is conducted during the execution of the file system services. In a step 240, based on the monitoring, a determination is made as to whether the machine learning model should be retrained before scheduling next or subsequent executions of the file system services.

In some cases, it may not be feasible to immediately retrain the model before executing one or more file system services. For example, it may be desirable to run one or more file system services multiple times a day or week. In this case, there may not be a sufficient amount of time to collect a historical resource utilization dataset that is representative of the use of resources of the protection storage system. Thus, the scheduler may revert back to a manual scheduling of the file system services where, for a temporary collection period, the user is prompted to specify the execution schedule of the file system services or to hold-off on scheduling file system services. During the temporary period, the resource utilization collection unit continues collecting resource utilization data until a dataset representative of the use of resources has been collected.

A duration of the temporary period may be based on one or more cycles associated with the data protection storage system. A cycle is a series of events that are regularly repeated in the same order. For example, a cycle may be defined as the completion of a full backup. Some organizations may perform daily incremental backups and weekly full backups. In this example, a cycle may be defined as the completion of a weekly full backup. A duration of the temporary period may be defined as a completion of two or more cycles. This allows a first portion of the collected resource utilization dataset to be used for retraining the machine learning model and a second portion of the collected resource utilization dataset to be used to validate the model.

In other words, the first portion of the collected resource utilization dataset may be provided as input to the machine learning model. Based on the first portion of the dataset, the machine learning model outputs a predicated resource utilization pattern. The accuracy of the predicted resource utilization pattern can be evaluated against the second portion of the dataset. The first portion of the dataset (training dataset) may be greater than the second portion of the dataset (validation dataset). If the accuracy or error in prediction does not meet a desired threshold, the temporary period may be extended so that additional resource utilization data can be collected to improve the prediction accuracy. This process of collecting additional resource utilization data, generating predicted utilization patterns, and validating the prediction may be repeated until a threshold or an acceptable level of prediction accuracy is achieved. The threshold may be a configurable value. In a specific embodiment, reaching the acceptable level of prediction accuracy triggers automatic scheduling of the file system services.

The amount of data to collect for training or retraining the model may be a configurable value. Resource utilization data may be collected over a period of 1, 2, 3, 4, 5, 6, 7, 8, 9, 10, or more than 10 days. Data may be collected over a period of two weeks, 1 month, or for any period of time as desired. A collection period may be based on a sliding time duration depending upon an accuracy of the prediction. As an example, consider that a machine learning model has been trained using data collected over a first period of time. A first predicted utilization pattern generated by the model, however, is shown to have a very high prediction error or to be inaccurate. In this case, the machine learning module may be retrained using data collected over a second period of time having a duration greater than the first period of time. The process of iteratively retraining the machine learning model using increasing amounts of training data may be repeated until the prediction error falls below a desired level.

In a specific embodiment, retraining the machine learning model is not triggered until the predicted utilization patterns have failed to meet their desired accuracy target a threshold number of consecutive times. A missed prediction may have been due to an aberration rather than a fundamental change in the system. Thus, rather than potentially disrupting normal operations by immediately beginning a retraining phase, the monitor may instead wait until a certain number of consecutive misses has been detected. The number of misses required to trigger a retraining may be a configurable value. For example, the number misses may be configured to be 2, 3, 4, 5, or more than 5 times.

Figure 2B:
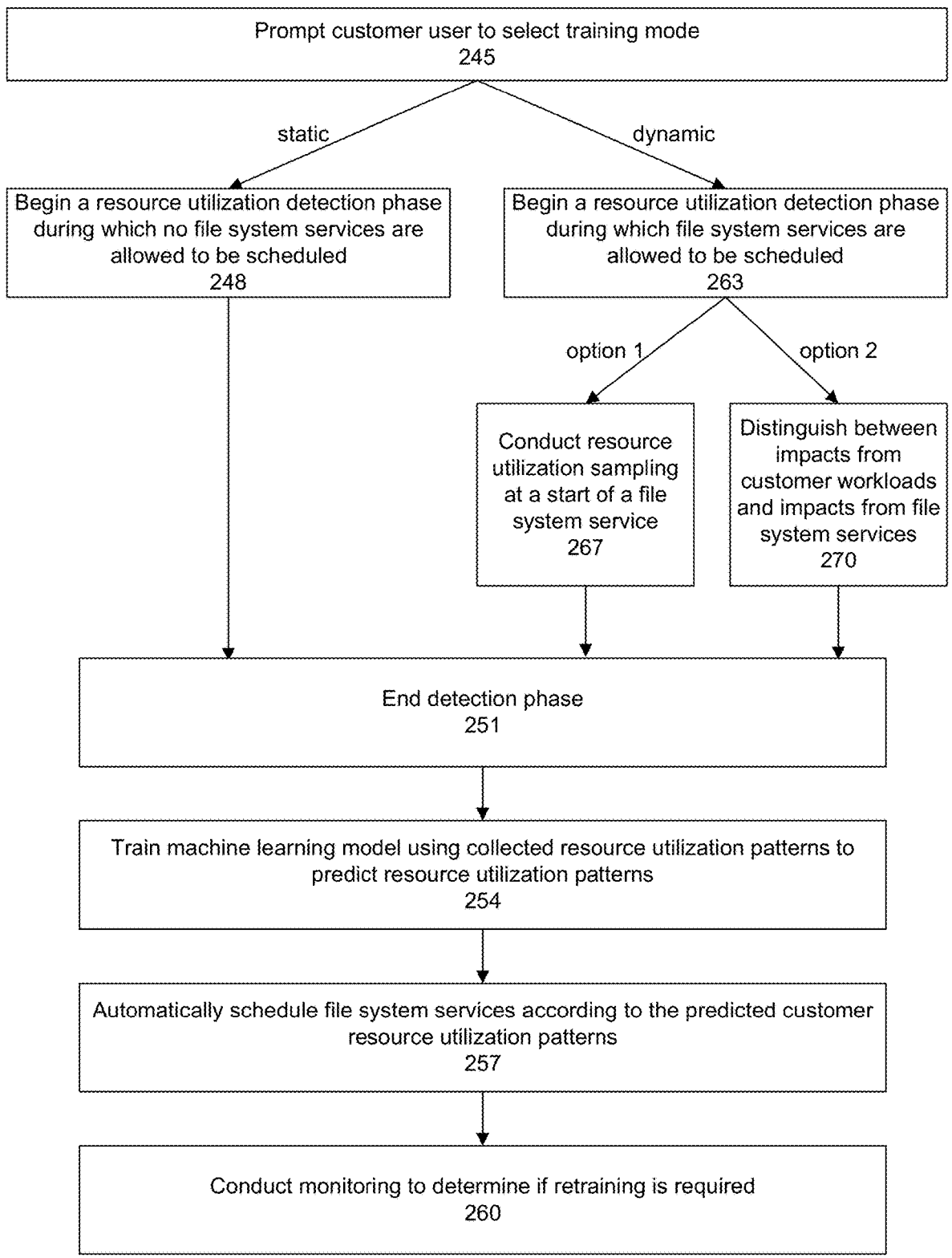
FIG. 2B shows a flow of modes for training a machine learning model, according to one or more embodiments.

FIG. 2B shows a flow diagram of modes for training a machine learning model. In a specific embodiment, there are two modes of training the model to detect customer usage pattern. A first mode of training may be referred to as static training. A second mode of training may be referred to as dynamic training. Within the dynamic training model, there can further be two options.

In the static training model, the goals are two fold including detecting the customer resource utilization pattern and predicting the customer resource utilization pattern. In the static model, the detection phase runs exclusively without any file system services scheduled. For example, a detection algorithm may run for a week and learn about the customer utilization pattern. Based on the customer utilization pattern, the machine learning model may predict that there is low utilization of a resource (e.g., low disk utilization) on Sunday at 2:00 AM to 4:00 AM. If the reality is that at 2:00 AM utilization is above a threshold value, the error will be high. If the error is consistently high for many scheduling periods, then the assumption is that the customer workload pattern has changed. Thus, a new training phase is called for. In a specific embodiment, the static model training phase needs to be scheduled at an opportune time, e.g., exclusively without any file system services running. With the static model, once trained, there is no on-the-job-learning.

It should be appreciated that low disk utilization is merely an example of a particular resource and other parameters may instead or additionally be used. The machine learning model may track any number of parameters associated with any number of resources.

In a specific embodiment, for some backup applications, a metric or parameter used to measure the accuracy of the machine learning model's prediction is throughput. For other applications, the parameter may instead or additionally include latency. It should be appreciated that any parameter or combination of parameters may be tracked and compared to a desired threshold to determine when a retraining of the machine learning model may be required.

In the dynamic training model (option 1), the goals are likewise two fold including detecting the customer resource utilization pattern and predicting customer resource utilization pattern. In this dynamic model, the detection phase runs along with any file system services scheduled. As an example, consider that the detection algorithm runs for a week and learns all it can about the customer utilization pattern. Based on that, the machine learning model predicts that there is low disk utilization on Sunday at 2:00 AM to 4:00 AM. If the reality is that at 2:00 AM utilization is above a threshold value, the error will be high. This error sample at 2:00 AM is added to the model for future prediction.

But, in the current time, the file system service is scheduled in the 2:00 AM to 4:00 AM window. Note that the service will stop at 4:00 AM but may not have completed what it originally set out to. Here, in a specific embodiment, the learning sample frequency is only at the scheduling windows, i.e., may not be that frequent to show a deviation in the prediction In the dynamic training model (option 2), the goals are likewise two fold including detecting the customer resource utilization pattern and predicting the customer resource utilization pattern. In this case, the model trained and predicted for disk utilization will be separated from the model trained and predicted for customer workload. If the error of the predicted disk is high, the model is re-trained for disk utilization. Otherwise, it subtracts the disk utilization by the file system service to compute the error between predicted and actual customer workload. If this error is high, the model is re-trained for the customer workload.

Referring now to FIG. 2B, in a step 245, a customer user is prompted to select a training mode for the machine learning model. If the customer user selects a static training mode, in a step 248, a resource utilization detection phase is started during which no file system services are allowed to be scheduled. For example, file system services may be blocked or prevented from running during the resource utilization detection phase. Blocking file system services from running helps to facilitate the collection of resource utilization data that is representative of the customer's actual workloads. In a step 251, the detection phase ends.

In a step 254, the machine learning model is trained using the collected resource utilization patterns to predict resource utilization patterns. In a step 257, file system services are automatically scheduled according to the predicted resource utilization patterns. In a step 200, monitoring is conducted to determine if retraining is required.

If the customer selects a dynamic training mode, a resource utilization detection phase is started during which file system services are allowed to be scheduled. For example, one or more file system services may be executed during the resource utilization detection (and collection) phase. If the customer selects a first option for the dynamic training mode, in a step 267, resource utilization sampling is conducted at a start of executing a file system service. Conducting the sampling at the start of the file system service (e.g., immediately before the file system service begins executing), helps to ensure that the collected resource utilization information does not include the impact due to the execution of the file system service. In other words, no resource utilization sampling may be performed during the execution of the file system service.

If the customer selects a second option for the dynamic training mode, in a step 270, a distinction in resource utilization is made between impacts due to customer workloads and backups and impacts due to the file system services. For example, in a specific embodiment, a schedule of backup jobs may be compared against a schedule of file system services to determine whether there are any overlaps between backup windows and file system services windows. Resource utilization data collected from periods of overlap may be excluded or omitted from the resource utilization data used to train the machine learning model.

In another specific embodiment, the impact to resources due to the execution of the file system services may be excluded or omitted from the resource utilization data used to train the machine learning model.

The remaining steps including ending the detection phase (step 251), training the machine learning model to predict utilization patterns (step 254), automatically scheduling file system services (step 257), and conducting monitoring (step 260) may be as discussed previously. The system is flexible and allows each individual customer user to select their preferred training mode.

In order to prove operability, a prototype was built and experiments were conducted using several different types of machine learning models. It was observed that among the models evaluated, including linear regression, random forests, and long short term memory (LSTM), the LSTM model provided the most accurate predictions.

In a specific embodiment, machine learning techniques were implemented with a data storage system having SSD disks. On platforms with SSD disks, file system metadata from different file system modules are cached on the SSD disk. This implies that any metadata intensive operations will stress the SSD cache disk. But fixed schedules are not aware of SSD disk busy times leading to sub-optimal performance.

Using machine learning algorithms, the historical disk busy times of SSD disks were analyzed and the following was performed: 1) a training of the machine learning model using past disk busy percent values to determine disk utilization pattern; 2) using the trained model, predict the disk utilization pattern at a future time; and 3) using the predicted disk utilization pattern, automate scheduling of metadata intensive operations.

Figure 3:
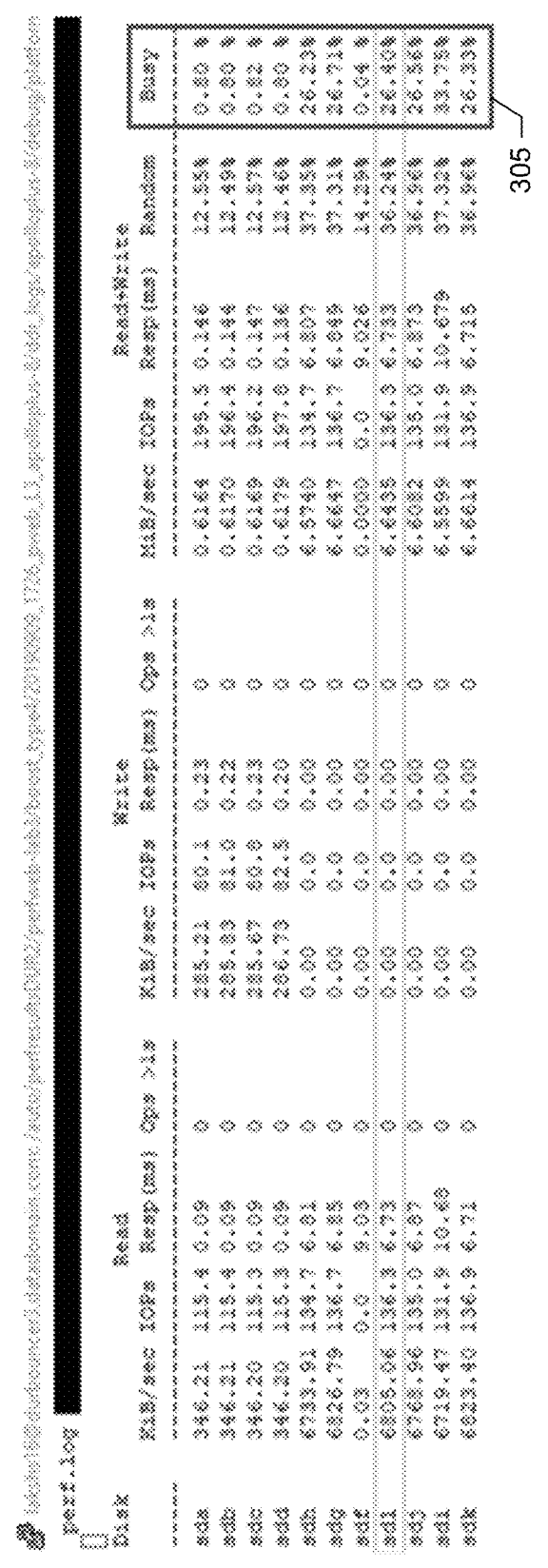

FIG. 3 shows a screenshot from a log file of disk statistics collected every 5 minutes for an in-use disk. The statistics include disk busy percentages, read input/output operations per second (IOPS), write IOPS, disk names, and other data. The parameter disk busy has been selected for analysis as shown by box 305.

The log file shown in FIG. 3 is generated by the Data Domain Operating System (DDOS) as provided by Dell EMC of Hopkinton, Mass., and may be referred to as "perf.log."

Table A below shows a flow for generating the data to feed and train a machine learning model.

TABLE A

| Step | Description |
|---|---|
| 1 | Obtain customer-generated perf.log. |
| 2 | Map the SSD disk into a disk name of SSD disk (like sdo). |
| 3 | Using perf.log, generate a set of tuples having the following form: <ssd disk name, timestamp, disk busy %> |
| 4 | Process the timestamp values by taking the user times and converting them to epoch time for use in the machine learning models. |
| 5 | Feed the tuples to train different machine learning algorithms to detect patterns. |
| 6 | Using the trained model, predict future patterns. |
| 7 | Validate the model and its accuracy by using a portion (e.g., 75 percent) of the tuples for training and validate the model using the remaining portion (e.g., 25 percent) of tuples as a validation set. |

Converting the time to epoch time (step 4, Table A) provides for encapsulating time (and date) into a single value, number, or integer, and facilitates the training and use of the machine learning model. Epoch time may be referred to as Unix time. Epoch or Unix time is a system for describing a point in time as a single value. In a specific embodiment, epoch time is the number of seconds that have elapsed since the Unix epoch, that is the time 00:00:00 UTC on 1 Jan. 1970, minus leap seconds.

For example, the collected resource utilization data may include a measurement indicating a utilization level of a particular resource at a particular time where the particular time is recorded as text, e.g., "Saturday, Mar. 14, 2020 6:03:26 PM." In a specific embodiment, the resource utilization collection unit processes the collected resource utilization data by converting the times to epoch times before supplying the machine learning model with the collected utilization data. Thus, in this example, the time or timestamp "Saturday, Mar. 14, 2020 6:03:26 PM" may be converted to an epoch timestamp having the value "1584209006." It should be appreciated, however, that any base reference point, other than the Unix epoch, may be used to convert a recorded timestamp into a single value.

In a specific embodiment, a method includes obtaining a performance log file of a resource, the performance log file comprising timestamps and measurements indicating utilization levels of the resource at times corresponding to the timestamps; converting the timestamps to epoch times; generating a set of tuples, each tuple comprising a first value corresponding to a measurement, and a second value corresponding to an epoch time; and providing the set of tuples to a machine learning model.

Figure 4:
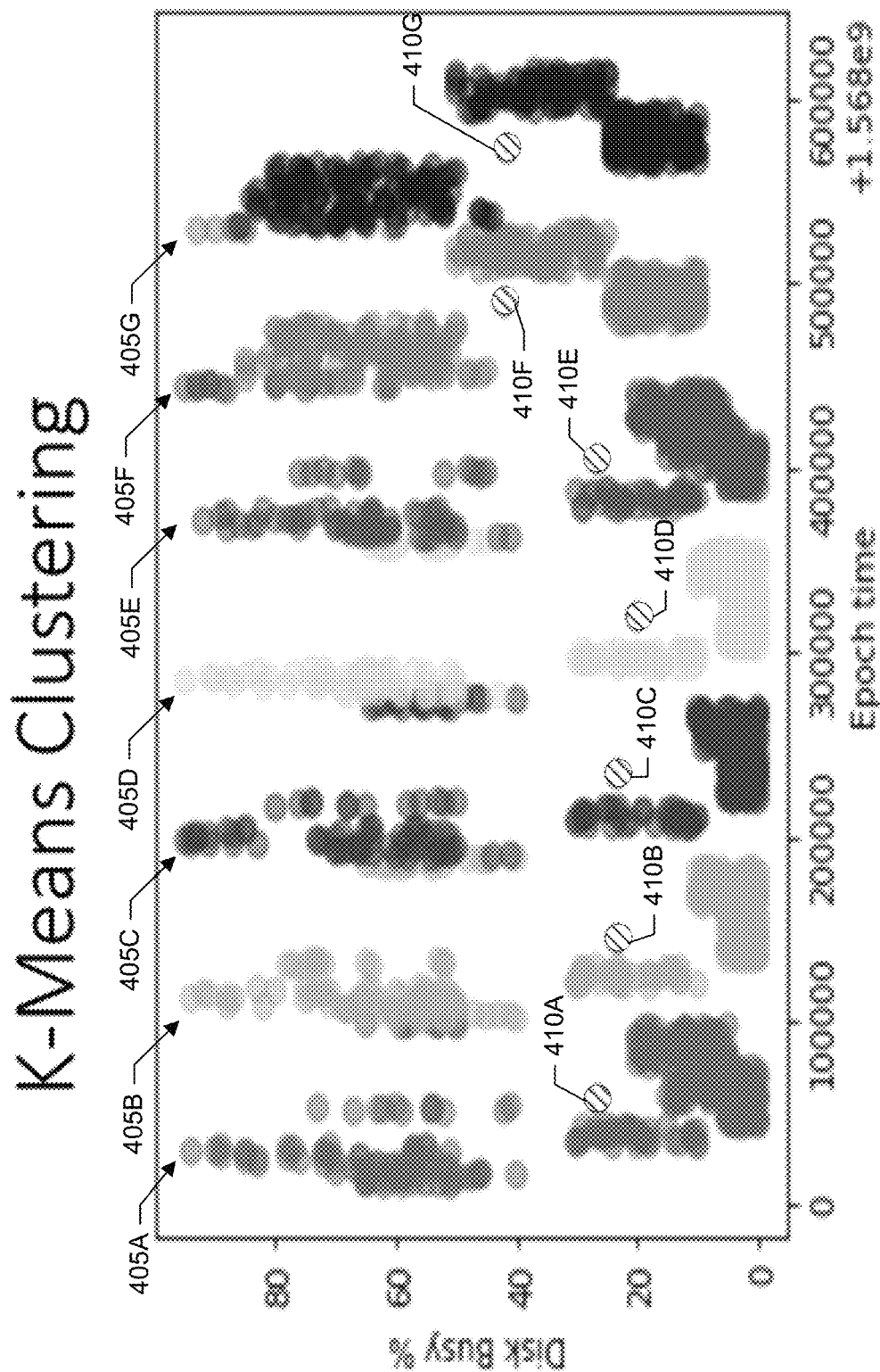
FIG. 4 shows a visualization of disk statistics according to a K-means clustering algorithm, according to one or more embodiments.

FIG. 4 shows a graph visualizing disk activity by applying a K-means clustering algorithm to the disk busy percentage statistical utilization data. More particularly, in order to detect if a pattern exists at all between time and disk busy utilization percentage, K-Means clustering was used on a fabricated usage pattern that spanned a 7-day usage cycle. Experiments were conducted with various values of K. On one of the data sets used, it was observed that the value of K=7 provides very good results. This is because there are 7 inherent clusters, 405A-405G, based on each day of the week (Monday to Sunday). This indicated that a pattern exists and can be detected.

Each cluster includes a centroid. The centroids are shown as dots 410A-G having a fill pattern of upward sloping diagonal lines. As shown in the graph of FIG. 4, in the rightmost 2 clusters, dots 410F and 410G are raised up or are higher than dots 410A-E. Dots 410A-G are centroids of clusters which indicate an average of percentage disk utilization for a particular day. This is as per expectation because, in certain 7-day usage cycles, backups take place on weekends. Thus, disk utilization tends to be on the higher side during weekends.

Several machine learning techniques were used to predict disk utilization % for future instances of time. In this specific embodiment, 75% of the data was used to train a selected model and 25% of the data was used to validate the selected model. In order to avoid over-fitting, K-fold cross-validation was used as well.

The machine learning models evaluated included linear regression, random forests, and long term short term memory (LSTM). Accuracy of prediction for each of the models is computed as shown in Table B below.

TABLE B

V = actual sample value
P = prediction of the same sample value
Root Square Error for one sample value = $[(P-V)/V]^2$
Root Mean Square Error for entire data set = Mean of all Root Square Error values The linear regression model produced a best accuracy of 78%. Linear regression uses the best fit line through all the training samples. It was discovered, however, that linear regression was not well suited for time-series data because of varying usage cycles which is hard to capture with good accuracy.

The random forests model is based on decision trees. The model attempts to average out the results by forming various smaller decision trees. Random forests produced a best accuracy of 91%.

Long term short term memory (LSTM) is a type of a recurrent neural network (RNN). The advantage of RNN is that it is able to connect previous information to the present task. However, the traditional RNN has the problem of exploding or vanishing gradient, making it very challenging to find the long term dependencies of the past and present. LSTM is designed to handle this problem by having the cell, input gate, output gate and forget gate. The cell will remember the value of the time interval, and the gates will control how the information should go into and out of the cell. LSTM is suitable to learn about the trend and make a prediction for time series data.

In a specific embodiment, the LSTM model was applied to train and validate the result. The datasets were divided into the train data and the validation data. The LSTM achieves a best accuracy of 95% for the validation data.

Figures 5, 6:
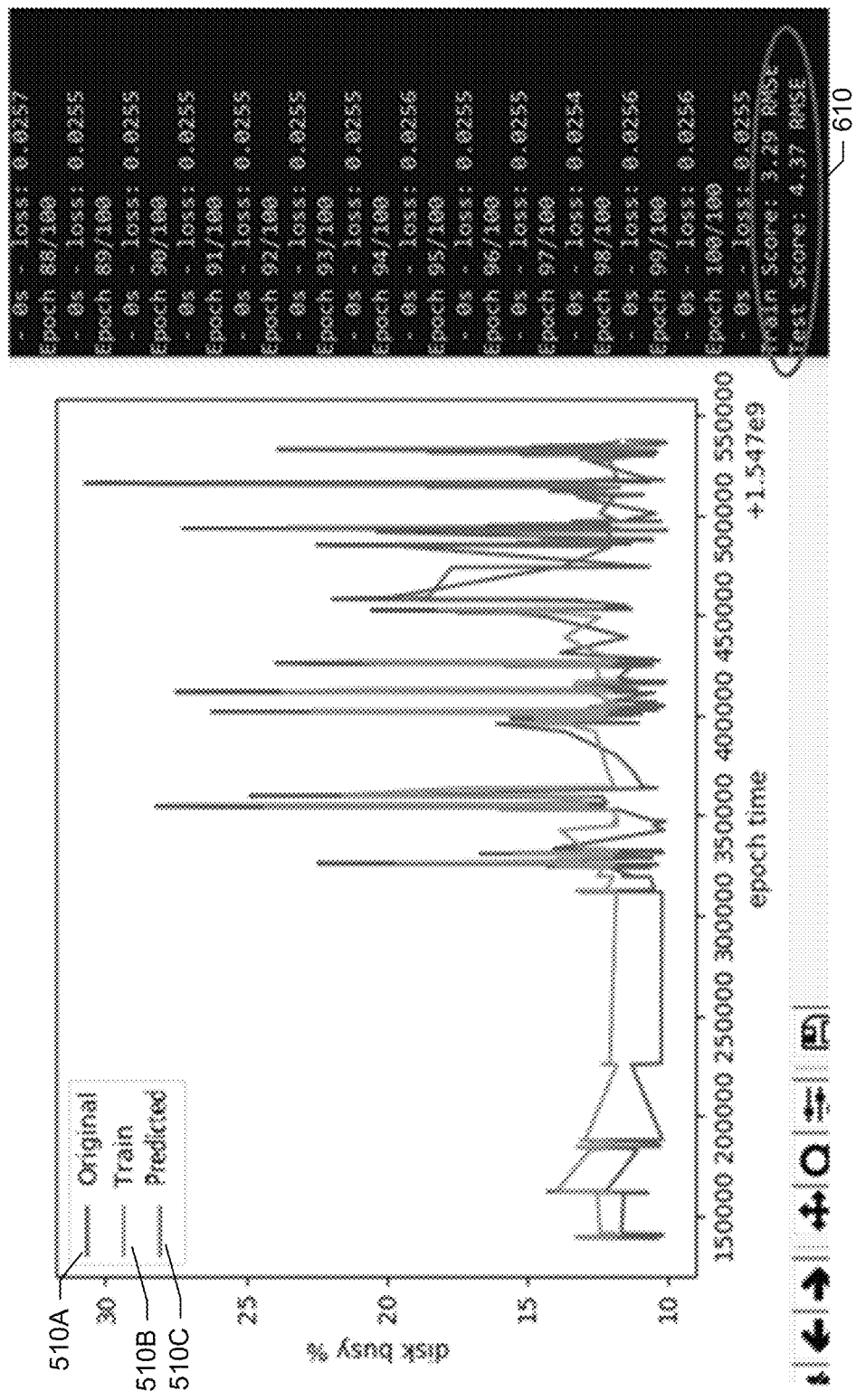
FIG. 5 shows line plots comparing actual and predicted utilization patterns, according to one or more embodiments.
FIG. 6 shows an example of calculating error between actual and predicted utilization patterns, according to one or more embodiments.

FIG. 5 shows a line chart of pattern detection and prediction. A y-axis shows disk busy %. An x-axis shows epoch time. A first line plot 510A corresponds to the original dataset. A second line plot 510B corresponds to the train dataset. A third line plot 510C corresponds to the predicted results.

FIG. 6 shows a summary of accuracy prediction for the LSTM model. As shown in the accuracy prediction results, LSTM produced a test score of 4.37% (610).

The LSTM model and prediction results shown in FIG. 5 were for a static set of samples. As discussed, systems and techniques are provided for a dynamic training of the model. If, through monitoring, accuracy falls below a certain threshold on the validation set, then it indicates that the pattern of usage has changed and hence retraining of the model may be required. This case can arise when the customer makes major changes in the system.

As shown in FIG. 6, disk usage can be predicted with good accuracy using the LSTM machine learning model. Using the results from the prediction, the file system services controller can generate and publish SSD cache disk next available windows. These windows indicate when resource utilization is low and for how long.

FIG. 7 shows an example of next available low utilization windows of SSD disks. In the example shown in FIG. 7, there is a first window 705A and a second window 705B. A window includes first and second parameters 715, 720, respectively. The first parameter specifies the start time of the window, and the second parameter specifies the duration of the window availability.

These generated windows are read by a services scheduler (e.g., scheduler 178—FIG. 1), which keeps a list of available windows and the services which are waiting/running. The services scheduler can assign the next available window to the requesting service(s) on a priority. The priority can be calculated based on how long or how much time the service is requesting and based on the predefined priority of the service.

For improved performance, metadata-intensive services such as file system consistency check (FSCK), file verification, compaction, and other services can register with a services scheduler for utilizing the above windows instead of running on a fixed interval. The services scheduler can call the registered service during the next available window based on a priority scheme.

In a specific embodiment, ML algorithms are applied to identify resource utilization patterns and predict future resource availability in order to make optimal resource usage. Each time a future resource availability is predicted, the accuracy and prediction error is monitored. When the prediction error goes beyond a threshold (e.g., customer backup work-load pattern changed significantly), the ML model is retrained with the latest available dataset. To achieve better resource utilization, the model may be trained with multi-features such as disk, CPU, memory utilization, or combinations of these.

Thus, rather than having system services manually scheduled or set to run on periodic intervals via a fixed schedule, ML techniques can be applied to provide more efficient use of resources and adapt to changing work patterns. In particular, as the workloads gravitate towards being 24×7 and changes over time, fixed and/or manual schedules become inefficient because there are simultaneous resource needs across parallel execution of system services.

In a specific embodiment, systems and techniques are provided for training and using a machine learning model to automatically schedule file system services (e.g., file verification, garbage collection, caching, or other batch processes). Such systems and techniques, however, may also be applied to load balancing, synchronous replication, and asynchronous replication.

For example, FIG. 8 shows a block diagram of a list of IoT devices 805A-N sending the data to a load balancer 810. The load balancer will move the data to corresponding servers 815A-N. To avoid the overload of the servers and achieve optimal performance, the load balancer needs to know the CPU, memory, and disk usage of each server in the future to move and schedule data movement. In a specific embodiment, a machine learning algorithm is applied to help the load balancer achieve this goal. In a specific embodiment, the load balancer queries the servers for the resource utilization pattern identified by the machine learning algorithms and uses that to intelligently select the appropriate servers. This helps to facilitate, for example, maximum write throughput while ingesting data and maximum read throughput while reading ingested data.

Figure 9:
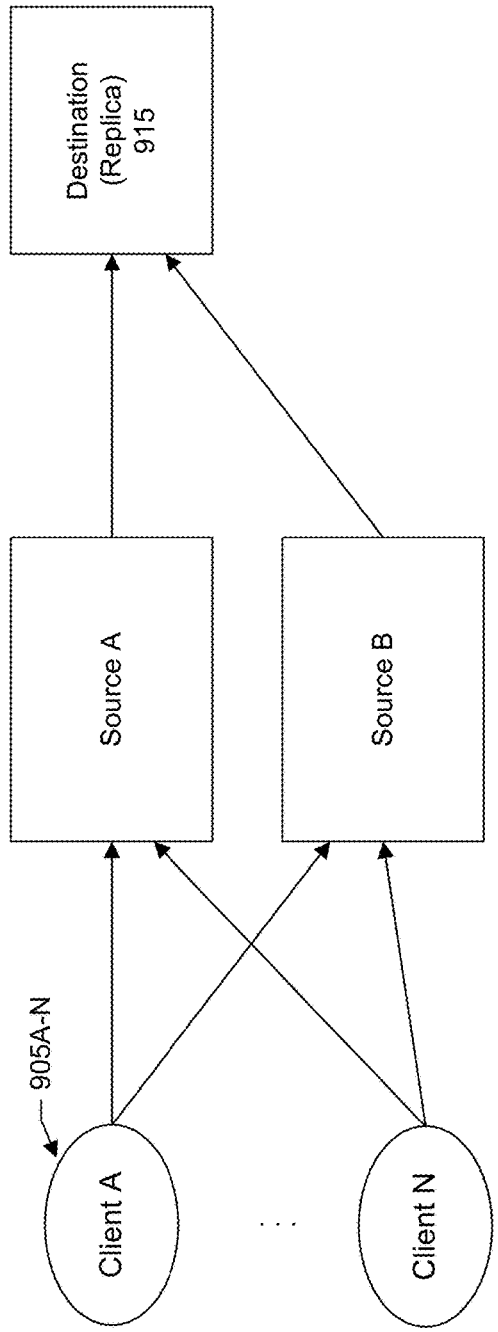
FIG. 9 shows a block diagram of synchronous replication in which machine learning algorithms may be applied to synchronously replicate data, according to one or more embodiments.

FIG. 9 shows a block diagram of synchronous replication in which machine learning algorithms may be applied. In the example shown in FIG. 9, there a set of clients 905A-N writing to one or more sources 910 which in turn replicate to a destination or replica 915. Synchronous replication refers to the process of mirroring data writes happening on the source system onto a replication system synchronously, i.e. without a mirror commit, the ingest on the source is not deemed complete.

In this specific embodiment, machine learning algorithms, running on the source, predict resource utilization according to the data ingest pattern. This prediction is accomplished by applying machine learning techniques to historical ingest data. Using that pattern, machine learning algorithms predict requirements at a future time. These predicted resource requirements are shared with the destination/replica to ensure that during the time slots that the client is going to ingest data, the destination (replica) has sufficient resources to receive the ingest. This is done to ensure that data can be copied to the destination and acknowledgment sent to the client as fast as possible. Thus, the purpose of synchronous replication is achieved by instantaneously sending an acknowledgment to the client.

Figure 10:
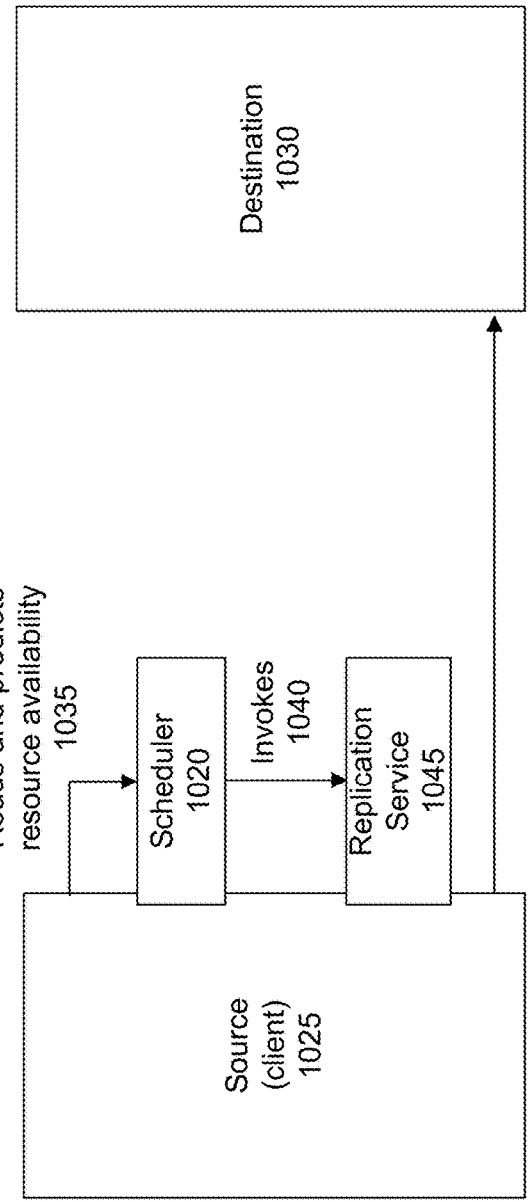
FIG. 10 shows a block diagram of asynchronous replication in which machine learning algorithms may be applied to asynchronously replicate data, according to one or more embodiments.

FIG. 10 shows a block diagram of asynchronous replication in which machine learning algorithms may be applied. In asynchronous replication, there can be multiple sources and multiple destinations. Consider, as an example, one source with one destination. In asynchronous replication, the data can be replicated at fixed intervals set by the administrator. Since the data transfer in this replication is not real-time, the time interval at which the replication data transfer can occur can be set by a scheduler 1020 instead of a fixed time.

In FIG. 10, the scheduler can be run on both source (client) 1025 and destination (replica) 1030. On the source/destination server, a machine learning algorithm monitors historical resource utilization data in order to predict 1035 the next available window which has available resources. On the source/server-side, whenever the scheduler sees a window, it can invoke 1040 a replication service 1045 to start the data transfer. The same or a similar technique can be extended on destination server 1030 via two schedulers on the source, and destination and co-ordination to predict the window of low resource utilization. The advantage of using ML-based scheduler in asynchronous replication can speed up the replication and cut the replication time due to high available resources (CPU, network, memory, and so forth).

In a specific embodiment, there is a method of efficiently managing a plurality of resources of a protection storage system comprising: registering a plurality of requests from a plurality of file system services of the storage system, each file system service when executed utilizing one or more resources, and each request comprising information describing resource requirements required by a respective file system service; collecting, over a period of time, resource utilization data of the plurality of resources, the resource utilization data comprising an identification of a resource, a timestamp, and a measurement indicating a utilization level of the resource corresponding to the timestamp; training, using the resource utilization data, a machine learning model to predict utilization patterns of the plurality of resources; based on the predicted utilization patterns, scheduling execution of the file system services; conducting monitoring during execution of the file system services; and based on the monitoring, determining whether the machine learning model should be retrained.

The method may further include computing a difference between the predicted utilization patterns and actual utilization patterns; comparing the difference against an acceptable threshold error; and when the difference is greater than the acceptable threshold error, retraining the machine learning model.

The method may further include monitoring a performance of the protection storage system; comparing the performance to a threshold performance; and when the performance falls below the threshold performance, retraining the model.

In an embodiment, the resource utilization data of a resource comprises timestamps, and measurements indicating utilization levels of the resource at times corresponding to the timestamps, and the training the machine learning model further comprises: processing the resource utilization data for the machine learning model by converting the timestamps to epoch times and generating tuples comprising a first value corresponding to a measurement, and a second value corresponding to an epoch time.

In an embodiment, a utilization pattern of a resource comprises an availability window indicating starting and ending times at which utilization of the resource is predicted to be low and the method further comprises: scheduling a file system service to be executed during the availability window, wherein registration information for the file system service indicates a requirement for the resource.

In an embodiment, the information describing resource requirements required by the respective file system resource comprises an expected utilization level of the resource. In an embodiment, the machine learning model comprises a Long Short Term Memory (LSTM) network.

In another specific embodiment, there is a system comprising: a processor; and memory configured to store one or more sequences of instructions which, when executed by the processor, cause the processor to carry out the steps of: registering a plurality of requests from a plurality of file system services of a protection storage system, each file system service when executed utilizing one or more resources of a plurality of resources, and each request comprising information describing resource requirements required by a respective file system service; collecting, over a period of time, resource utilization data of the plurality of resources, the resource utilization data comprising an identification of a resource, a timestamp, and a measurement indicating a utilization level of the resource corresponding to the timestamp; training, using the resource utilization data, a machine learning model to predict utilization patterns of the plurality of resources; based on the predicted utilization patterns, scheduling execution of the file system services; conducting monitoring during execution of the file system services; and based on the monitoring, determining whether the machine learning model should be retrained.

In another specific embodiment, there is a computer program product, comprising a non-transitory computer-readable medium having a computer-readable program code embodied therein, the computer-readable program code adapted to be executed by one or more processors to implement a method comprising: registering a plurality of requests from a plurality of file system services of a protection storage system, each file system service when executed utilizing one or more resources of a plurality of resources, and each request comprising information describing resource requirements required by a respective file system service; collecting, over a period of time, resource utilization data of the plurality of resources, the resource utilization data comprising an identification of a resource, a timestamp, and a measurement indicating a utilization level of the resource corresponding to the timestamp; training, using the resource utilization data, a machine learning model to predict utilization patterns of the plurality of resources; based on the predicted utilization patterns, scheduling execution of the file system services; conducting monitoring during execution of the file system services; and based on the monitoring, determining whether the machine learning model should be retrained.

Figure 11:
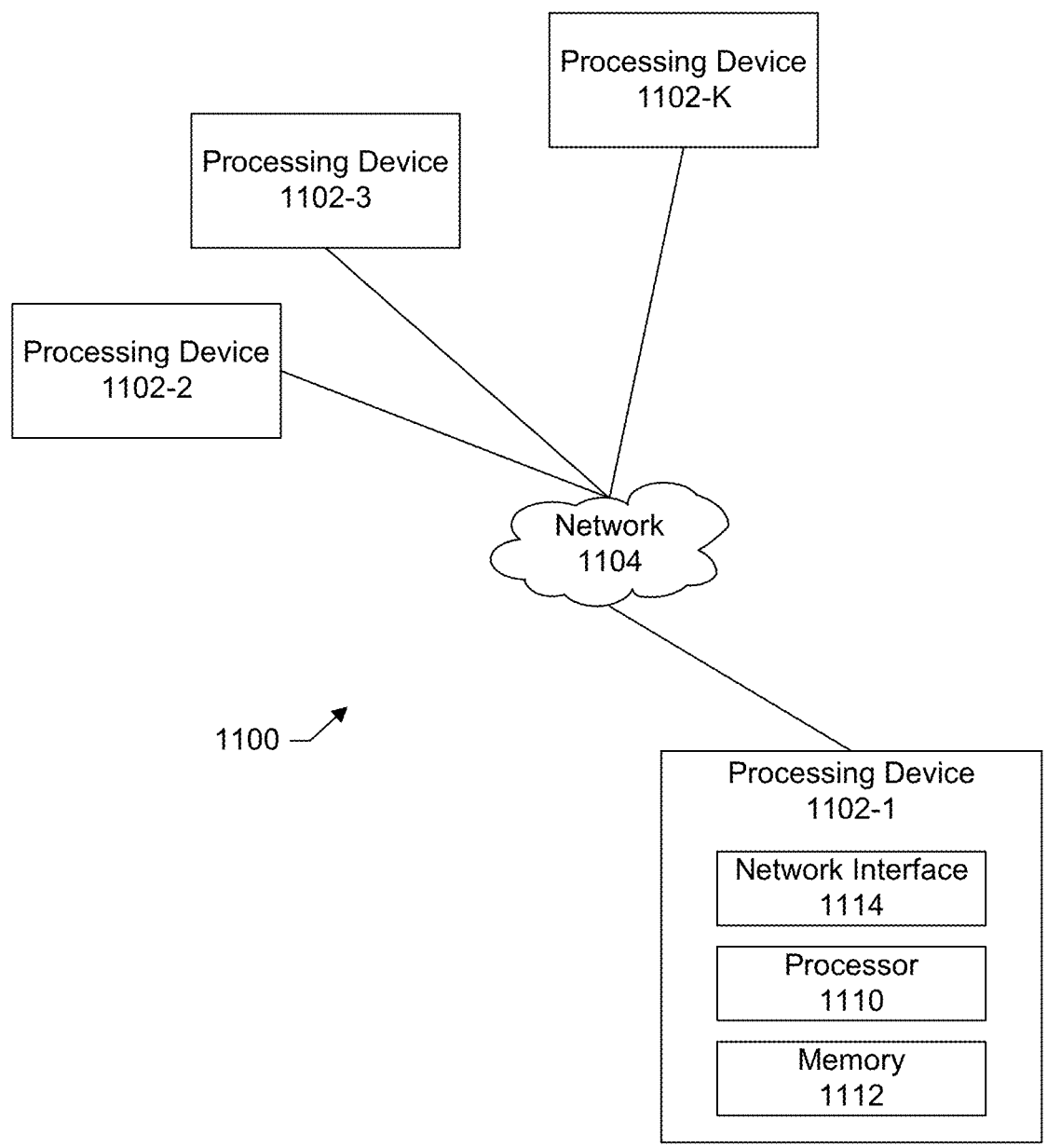
FIG. 11 shows another block diagram of a processing platform that may be utilized to implement at least a portion of an information processing system, according to one or more embodiments.

FIG. 11 shows an example of a processing platform 1100 that may be used with the information processing system shown in FIG. 1.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 12:
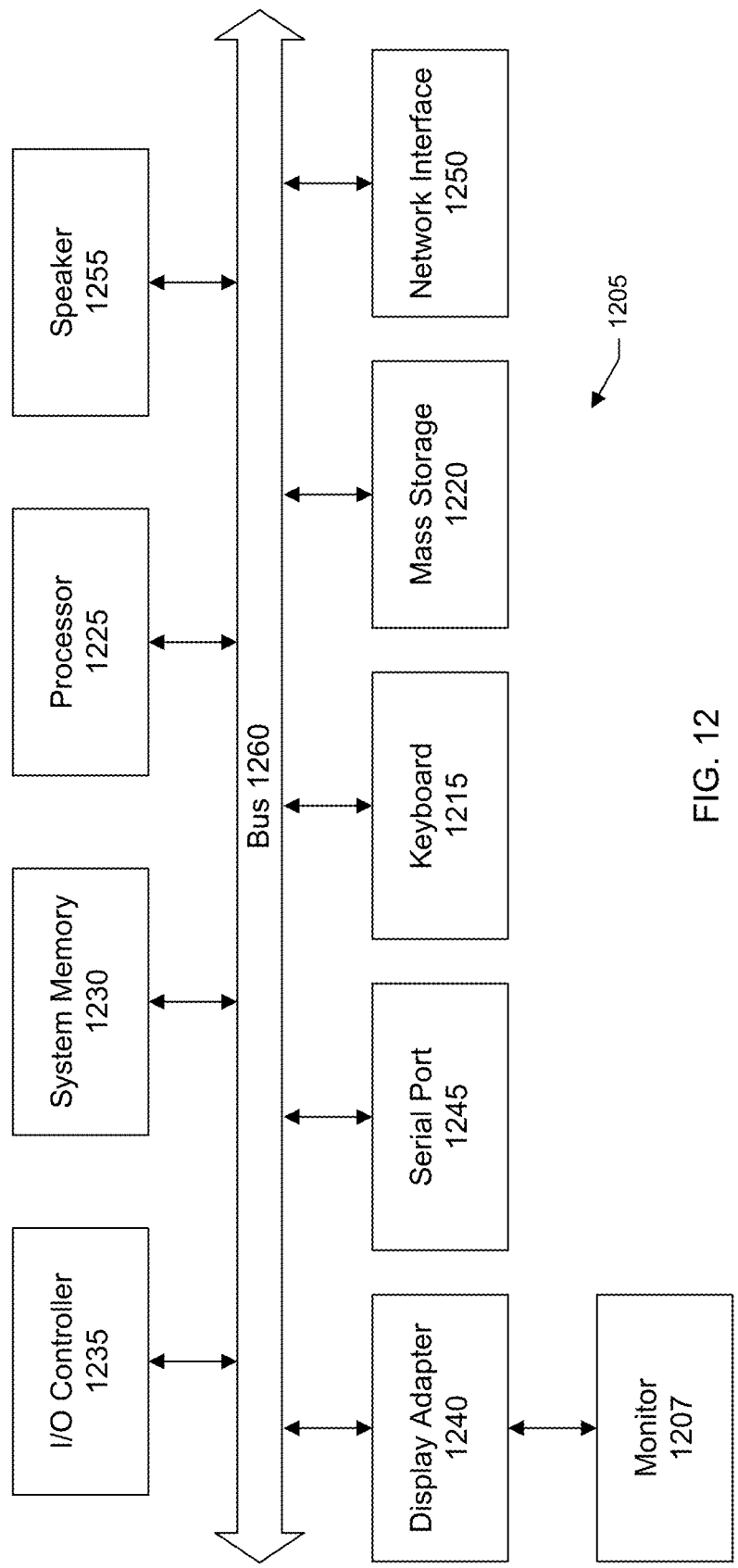
FIG. 12 shows a block diagram of a computer system suitable for use with the system, according to one or more embodiments.

FIG. 12 shows a system block diagram of a computer system 1205 used to execute the software of the present system described herein. The computer system includes a monitor 1207, keyboard 1215, and mass storage devices 1220. Computer system 1205 further includes subsystems such as central processor 1225, system memory 1230, input/output (I/O) controller 1235, display adapter 1240, serial or universal serial bus (USB) port 1245, network interface 1250, and speaker 1255. The system may also be used with computer systems with additional or fewer subsystems. For example, a computer system could include more than one processor 1225 (i.e., a multiprocessor system) or a system may include a cache memory.

Arrows such as 1260 represent the system bus architecture of computer system 1205. However, these arrows are illustrative of any interconnection scheme serving to link the subsystems. For example, speaker 1255 could be connected to the other subsystems through a port or have an internal direct connection to central processor 1225. The processor may include multiple processors or a multicore processor, which may permit parallel processing of information. Computer system 1205 shown in FIG. 12 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of efficiently managing a plurality of resources of a protection storage system comprising:
    registering a plurality of requests from a plurality of file system services of the storage system, each file system service when executed utilizing one or more resources, and each request comprising information describing resource requirements required by a respective file system service;
    collecting, over a period of time, resource utilization data of the plurality of resources, the resource utilization data comprising an identification of a resource, a timestamp, and a measurement indicating a utilization level of the resource corresponding to the timestamp;
    training, using the resource utilization data, a machine learning model to predict utilization patterns of the plurality of resources;
    based on the predicted utilization patterns, scheduling execution of the file system services;
    conducting monitoring during execution of the file system services; and
    based on the monitoring, determining whether the machine learning model should be retrained, wherein the resource utilization data of a resource comprises timestamps, and measurements indicating utilization levels of the resource at times corresponding to the timestamps, and the training the machine learning model further comprises:
    processing the resource utilization data for the machine learning model by converting the timestamps to epoch times and generating tuples comprising a first value corresponding to a measurement, and a second value corresponding to an epoch time.

2. The method of claim 1 further comprising:
    computing a difference between the predicted utilization patterns and actual utilization patterns;
    comparing the difference against an acceptable threshold error; and
    when the difference is greater than the acceptable threshold error, retraining the machine learning model.

3. The method of claim 1 further comprising:
monitoring a performance of the protection storage system;
comparing the performance to a threshold performance; and
when the performance falls below the threshold performance, retraining the model.

4. The method of claim 1 wherein a utilization pattern of a resource comprises an availability window indicating starting and ending times at which utilization of the resource is predicted to be low and the method further comprises:
scheduling a file system service to be executed during the availability window, wherein registration information for the file system service indicates a requirement for the resource.

5. The method of claim 1 wherein the information describing resource requirements required by the respective file system resource comprises an expected utilization level of the resource.

6. The method of claim 1 wherein the machine learning model comprises a Long Short Term Memory (LSTM) network.

7. A system comprising: a processor; and memory configured to store one or more sequences of instructions which, when executed by the processor, cause the processor to carry out the steps of:
registering a plurality of requests from a plurality of file system services of a protection storage system, each file system service when executed utilizing one or more resources of a plurality of resources, and each request comprising information describing resource requirements required by a respective file system service;
collecting, over a period of time, resource utilization data of the plurality of resources, the resource utilization data comprising an identification of a resource, a timestamp, and a measurement indicating a utilization level of the resource corresponding to the timestamp;
training, using the resource utilization data, a machine learning model to predict utilization patterns of the plurality of resources;
based on the predicted utilization patterns, scheduling execution of the file system services;
conducting monitoring during execution of the file system services; and
based on the monitoring, determining whether the machine learning model should be retrained, wherein the resource utilization data of a resource comprises timestamps, and measurements indicating utilization levels of the resource at times corresponding to the timestamps, and the training the machine learning model further comprises:
processing the resource utilization data for the machine learning model by converting the timestamps to epoch times and generating tuples comprising a first value corresponding to a measurement, and a second value corresponding to an epoch time.

8. The system of claim 7 wherein the processor further carries out the steps of:
computing a difference between the predicted utilization patterns and actual utilization patterns;
comparing the difference against an acceptable threshold error; and
when the difference is greater than the acceptable threshold error, retraining the machine learning model.

9. The system of claim 7 wherein the processor further carries out the steps of:
monitoring a performance of the protection storage system;
comparing the performance to a threshold performance; and
when the performance falls below the threshold performance, retraining the model.

10. The system of claim 7 wherein a utilization pattern of a resource comprises an availability window indicating starting and ending times at which utilization of the resource is predicted to be low and the processor further carries out the steps of:
scheduling a file system service to be executed during the availability window, wherein registration information for the file system service indicates a requirement for the resource.

11. The system of claim 7 wherein the information describing resource requirements required by the respective file system resource comprises an expected utilization level of the resource.

12. The system of claim 7 wherein the machine learning model comprises a Long Short Term Memory (LSTM) network.

13. A computer program product, comprising a non-transitory computer-readable medium having a computer-readable program code embodied therein, the computer-readable program code adapted to be executed by one or more processors to implement a method comprising:
registering a plurality of requests from a plurality of file system services of a protection storage system, each file system service when executed utilizing one or more resources of a plurality of resources, and each request comprising information describing resource requirements required by a respective file system service;
collecting, over a period of time, resource utilization data of the plurality of resources, the resource utilization data comprising an identification of a resource, a timestamp, and a measurement indicating a utilization level of the resource corresponding to the timestamp;
training, using the resource utilization data, a machine learning model to predict utilization patterns of the plurality of resources;
based on the predicted utilization patterns, scheduling execution of the file system services;
conducting monitoring during execution of the file system services; and
based on the monitoring, determining whether the machine learning model should be retrained, wherein the resource utilization data of a resource comprises timestamps, and measurements indicating utilization levels of the resource at times corresponding to the timestamps, and the training the machine learning model further comprises:
processing the resource utilization data for the machine learning model by converting the timestamps to epoch times and generating tuples comprising a first value corresponding to a measurement, and a second value corresponding to an epoch time.

14. The computer program product of claim 13 wherein the method further comprises:
computing a difference between the predicted utilization patterns and actual utilization patterns;
comparing the difference against an acceptable threshold error; and
when the difference is greater than the acceptable threshold error, retraining the machine learning model.

15. The computer program product of claim 13 wherein the method further comprises:
- monitoring a performance of the protection storage system;
- comparing the performance to a threshold performance; and
- when the performance falls below the threshold performance, retraining the model.

16. The computer program product of claim 13 wherein a utilization pattern of a resource comprises an availability window indicating starting and ending times at which utilization of the resource is predicted to be low and the method further comprises:
- scheduling a file system service to be executed during the availability window, wherein registration information for the file system service indicates a requirement for the resource.

17. The computer program product of claim 13 wherein the machine learning model comprises a Long Short Term Memory (LSTM) network.

* * * * *